United States Patent
Furukawa et al.

(10) Patent No.: US 8,470,389 B2
(45) Date of Patent: Jun. 25, 2013

(54) METHOD OF MANUFACTURING SOLID ELECTROLYTIC CAPACITOR

(75) Inventors: Takeshi Furukawa, Kanzaki (JP); Yuichiro Inutsuka, Isahaya (JP)

(73) Assignees: SANYO Electric Co., Ltd., Moriguchi-shi, Osaka (JP); SAGA SANYO INDUSTRIES Co., Ltd., Kishima-gun, Saga (JP)

(*) Notice: Subject to any disclaimer, the term of this patent is extended or adjusted under 35 U.S.C. 154(b) by 509 days.

(21) Appl. No.: 12/627,796

(22) Filed: Nov. 30, 2009

(65) Prior Publication Data
US 2010/0136222 A1 Jun. 3, 2010

(30) Foreign Application Priority Data

Dec. 1, 2008 (JP) ................. 2008-305923
Dec. 25, 2008 (JP) ................. 2008-330420

(51) Int. Cl.
*H01G 11/56* (2006.01)
*H01G 11/54* (2006.01)
*H01G 9/15* (2006.01)
*H01G 9/151* (2006.01)

(52) U.S. Cl.
USPC .............. 427/80; 427/58; 427/79; 361/523; 361/525; 361/528; 361/530; 29/25.01; 29/25.02; 29/25.03; 29/623.1; 29/623.5

(58) Field of Classification Search
None
See application file for complete search history.

(56) References Cited

U.S. PATENT DOCUMENTS

| 4,910,645 A | 3/1990 | Jonas et al. |
| 6,072,694 A * | 6/2000 | Hahn et al. ............. 361/523 |
| 6,430,033 B1 * | 8/2002 | Mitsui et al. ............. 361/525 |
| 2002/0015278 A1 * | 2/2002 | Fukuyama et al. ........ 361/523 |
| 2006/0221549 A1 | 10/2006 | Iida et al. |
| 2007/0183120 A1 | 8/2007 | Fujimoto et al. |
| 2008/0099179 A1 * | 5/2008 | Wang et al. ............... 164/526 |
| 2008/0213460 A1 * | 9/2008 | Benter et al. ............. 427/2.1 |

FOREIGN PATENT DOCUMENTS

| CN | 101017735 A | 8/2007 |
| EP | 1 503 813 B1 | 5/2007 |
| JP | 02-015611 A | 1/1990 |
| JP | 2006-278790 A | 10/2006 |
| JP | 2007-150252 A | 6/2007 |
| JP | 2008-251629 A | 10/2008 |

OTHER PUBLICATIONS

UNTRACHT, Jewelry Concepts and Technology, Random House, (1982), pp. 475.*
Chinese Office Action dated Jun. 29, 2012, issued in corresponding Chinese Patent Application No. 200911000302.4, with English Translation (12 pages).
Taiwanese Office Action dated Jan. 22, 2013, issued in corresponding Taiwanese Patent Application No. 098140286.

* cited by examiner

*Primary Examiner* — Nathan Empie
*Assistant Examiner* — Lisha Jiang
(74) *Attorney, Agent, or Firm* — Westerman, Hattori, Daniels & Adrian, LLP

(57) ABSTRACT

Provided is a method of manufacturing a solid electrolytic capacitor, including the steps of: forming a capacitor element including an anode body having a dielectric coating film on a surface thereof; impregnating the capacitor element with a polymerization liquid containing a precursor monomer of a conductive polymer and an oxidant; impregnating the capacitor element impregnated with the polymerization liquid with a silane compound or a silane compound containing solution; and forming a conductive polymer layer by polymerizing the precursor monomer after impregnating the capacitor element with the silane compound or the silane compound containing solution.

3 Claims, 2 Drawing Sheets

METHOD OF MANUFACTURING SOLID ELECTROLYTIC CAPACITOR

BACKGROUND OF THE INVENTION

1. Field of the Invention

The present invention relates to a method of manufacturing a solid electrolytic capacitor having high performance.

2. Description of the Background Art

As a common winding-type solid electrolytic capacitor, the one shown in FIG. 1 is known.

As shown in a cross sectional view of FIG. 1, a solid electrolytic capacitor 100 includes a capacitor element 10, a bottomed case 11, a sealing member 12, a seat plate 13, and leads 14A and 14B. Lead tabs 16A and 16B are connected to capacitor element 10, and leads 14A and 14B are electrically connected to lead tabs 16A and 16B, respectively. Capacitor element 10 is accommodated in bottomed case 11, and the accommodated capacitor element 10 is sealed with sealing member 12. The vicinity of an opening end of bottomed case 11 is subjected to pressing in a lateral direction and curling, and seat plate 13 is placed on a curled portion.

FIG. 2 is a view for describing capacitor element 10, showing a state where capacitor element 10 is partially exploded. As shown in FIG. 2, capacitor element 10 is formed by winding an anode body 21 having a dielectric coating film formed on a surface thereof and a cathode body 22, with a separator 23 being interposed therebetween, and thereafter securing the wound body with a winding stop tape 24. In capacitor element 10, lead 14A is connected with anode body 21 through lead tab 16A, and lead 14B is connected with cathode body 22 through lead tab 16B.

As an electrolyte of solid electrolytic capacitor 100 with a configuration as described above, for example, a solid electrolyte made of a conductive polymer is used. The solid electrolyte is charged into a gap between anode body 21 and cathode body 22. As a solid electrolyte made of a conductive polymer, for example, polythiophene is disclosed in Japanese Patent Laying-Open No. 2-15611.

SUMMARY OF THE INVENTION

As digitization of electronic equipment proceeds recently, solid electrolytic capacitors as described above have been required to have a smaller size, a larger capacity, and a lower ESR. Herein, ESR refers to an equivalent series resistance.

Further, in the field of on-vehicle equipment and industrial equipment used in a severe environment, solid electrolytic capacitors with a high voltage proof property have been more required. Conventionally, examples of a method of causing a solid electrolytic capacitor to have a high voltage proof property include a method of causing a dielectric coating film formed on a surface of an anode body to have a high voltage proof property by increasing chemical conversion voltage applied during chemical conversion treatment for forming the dielectric coating film. However, when the chemical conversion voltage is increased, there occur problems such as increases in leak current and a short circuit occurrence ratio of the solid electrolytic capacitor.

One object of the present invention is to provide a method of manufacturing a solid electrolytic capacitor capable of manufacturing a solid electrolytic capacitor having a smaller leak current, a lower short circuit occurrence ratio, and a high voltage proof property.

A first aspect of the present invention is a method of manufacturing a solid electrolytic capacitor, including the steps of: forming a capacitor element including an anode body having a dielectric coating film on a surface thereof; impregnating the capacitor element with a polymerization liquid containing a precursor monomer of a conductive polymer and an oxidant; impregnating the capacitor element impregnated with the polymerization liquid with a silane compound or a silane compound containing solution; and forming a conductive polymer layer by polymerizing the precursor monomer after impregnating the capacitor element with the silane compound or the silane compound containing solution.

Preferably, in the first aspect of the present invention, the silane compound containing solution is made of a silane compound and an organic solvent, and the silane compound in the silane compound containing solution has a concentration of not less than 10 wt %.

Preferably, in the first aspect of the present invention, the organic solvent is at least one of organic solvents including alcohols, hydrocarbons, esters, and ketones.

A second aspect of the present invention is a method of manufacturing a solid electrolytic capacitor, including the steps of: forming a capacitor element by winding an anode body having a dielectric coating film on a surface thereof and a cathode body; forming a conductive polymer layer by impregnating the capacitor element with a polymerization liquid containing a precursor monomer of a conductive polymer and an oxidant and thereafter polymerizing the precursor monomer; and forming a silane compound layer on a surface of the conductive polymer layer by impregnating the capacitor element having the formed conductive polymer layer with a silane compound or a silane compound containing solution and thereafter drying the capacitor element.

Preferably, in the second aspect of the present invention, a drying temperature in the step of forming the silane compound layer is not less than 50° C. and not more than 150° C.

Preferably, in the second aspect of the present invention, the silane compound containing solution is made of a silane compound and an organic solvent, and the silane compound in the silane compound containing solution has a concentration of not less than 5 wt %.

According to the present invention, a highly reliable solid electrolytic capacitor having a smaller leak current, a lower short circuit occurrence ratio, and a high voltage proof property can be manufactured.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
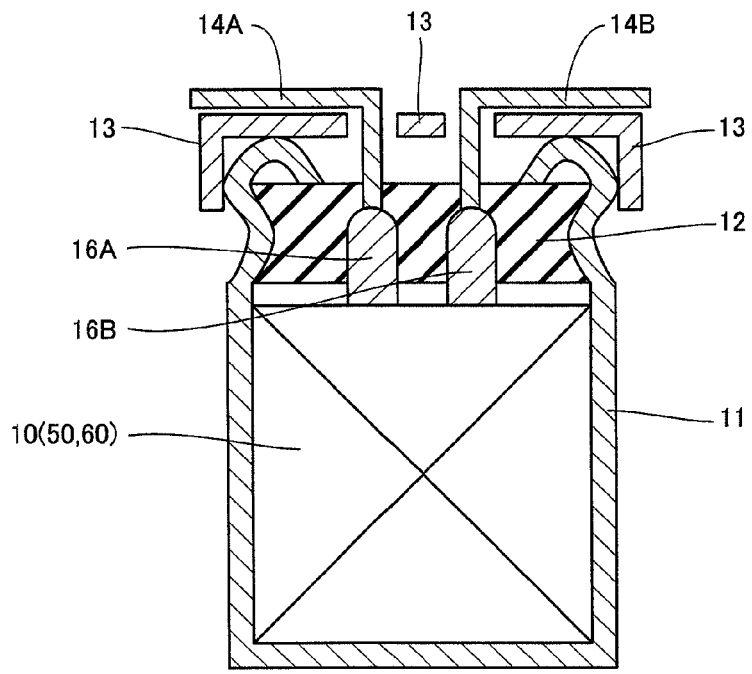
FIG. 1 is a cross sectional view of a common winding-type solid electrolytic capacitor.

Hereinafter, embodiments of the present invention will be described. It is to be noted that identical or corresponding parts in the drawings will be designated by the same reference numerals, and the description thereof will not be repeated. Further, dimensional relations among lengths, sizes, widths, <First Embodiment>

Figure 2:
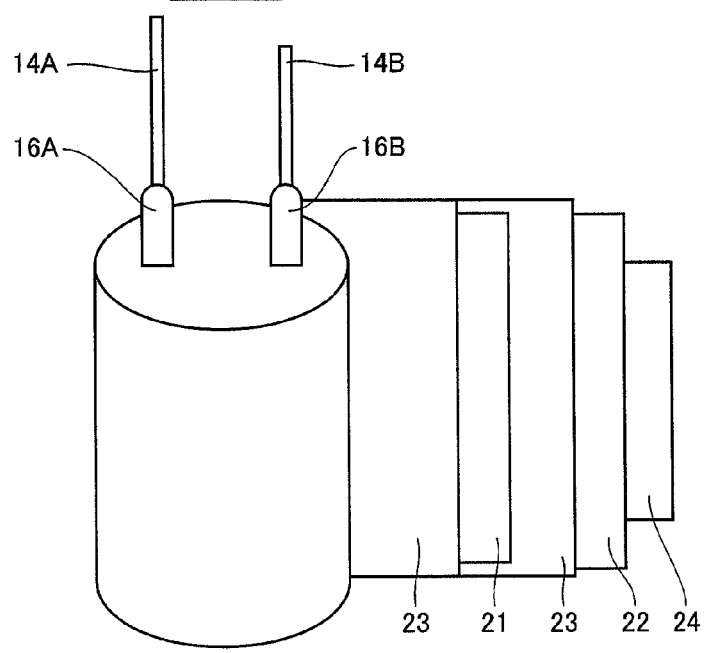
FIG. 2 is a view for describing a capacitor element in the solid electrolytic capacitor of FIG. 1.

A solid electrolytic capacitor 500 manufactured by a method of manufacturing a solid electrolytic capacitor in accordance with a first embodiment has a configuration identical to that of common solid electrolytic capacitor 100 shown in FIG. 1 and FIG. 2 except for the configuration of a conductive polymer layer. Therefore, the configuration of solid electrolytic capacitor 500 will be described below, using FIG. 1 and FIG. 2.

Solid electrolytic capacitor 500 manufactured in the first embodiment includes a capacitor element 50, bottomed case 11, sealing member 12, seat plate 13, and leads 14A and 14B. Lead tabs 16A and 16B are connected to capacitor element 50, and leads 14A and 14B are electrically connected to lead tabs 16A and 16B, respectively. Capacitor element 50 is accommodated in bottomed case 11, and the accommodated capacitor element 50 is sealed with sealing member 12. The vicinity of an opening end of bottomed case 11 is subjected to pressing in a lateral direction and curling, and seat plate 13 is placed on a curled portion.

Capacitor element 50 includes anode body 21 connected with lead tab 16A, cathode body 22 connected with lead tab 16B, and separator 23. Of anode body 21 and cathode body 22, a dielectric coating film is formed on a surface of at least anode body 21.

Insolid electrolytic capacitor 500, a conductive polymer layer is formed at each gap between anode body 21, cathode body 22, and separator 23 of capacitor element 50. A silane compound is present in the conductive polymer layer. The concentration ($g/cm^3$) of the silane compound in the conductive polymer layer in the vicinity of the dielectric coating film on anode body 21 is lower than the concentration ($g/cm^3$) of the silane compound in other portions.

Figure 3:
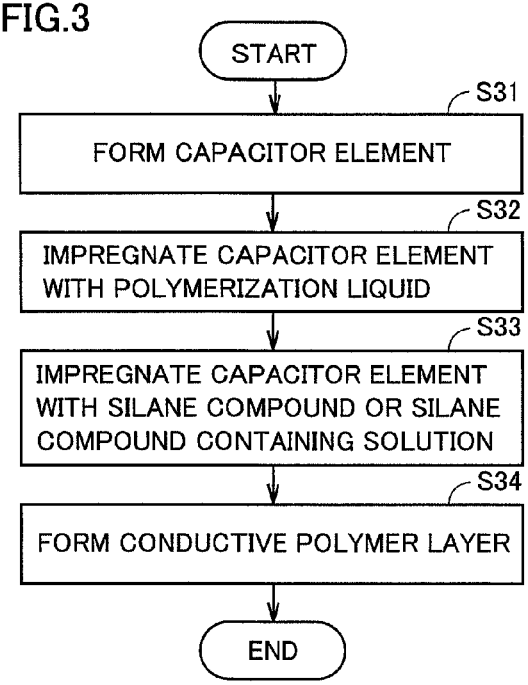
FIG. 3 is a flowchart showing a process of manufacturing a capacitor element in accordance with a first embodiment.

A method of manufacturing solid electrolytic capacitor 500 described above will be described using FIG. 3.

Firstly, in step S31, capacitor element 50 is formed by winding anode body 21 having a dielectric coating film formed on a surface thereof and cathode body 22, with separator 23 being interposed therebetween, and thereafter securing a wound end with winding stop tape 24. Lead tabs 16A and 16B are connected to anode body 21 and cathode body 22, respectively.

Then, in step S32, a polymerization liquid containing a precursor monomer and an oxidant is prepared, and capacitor element 50 is impregnated with the polymerization liquid. A precursor monomer refers to a compound that forms a conductive polymer by polymerization.

Subsequently, in step S33, before chemical polymerization of the polymerization liquid penetrating into capacitor element 50 is completed, capacitor element 50 is impregnated with a silane compound or a silane compound containing solution containing a silane compound.

Thereafter, in step S34, the chemical polymerization of the polymerization liquid penetrating into capacitor element 50 is completed, and thereby a conductive polymer layer is formed.

Through the steps described above, capacitor element 50 having the conductive polymer layer in which the silane compound is present is fabricated. After capacitor element 50 is accommodated in bottomed case 11, capacitor element 50 is sealed with sealing member 12, the vicinity of the opening end of bottomed case 11 is subjected to pressing in the lateral direction and curling, and seat plate 13 is placed on the curled portion. Thereby, solid electrolytic capacitor 500 shown in FIG. 1 is fabricated.

A silane compound has functions of improving molecular weight distribution and crystallinity of a conductive polymer, and strengthening binding of a conductive polymer chain by a cross-linking effect. Therefore, when compared with a solid electrolytic capacitor having no silane compound in a conductive polymer layer, a solid electrolytic capacitor having a silane compound in a conductive polymer layer has an improved voltage proof property, without causing increases in leak current and a short circuit occurrence ratio.

However, since the silane compound has no conductivity, when a wound body is impregnated with a polymerization liquid into which a silane compound is added, and a precursor monomer is chemically polymerized, a capacitor may have an increased ESR.

Regarding this, in the first embodiment, capacitor element 50 is impregnated with a polymerization liquid, then impregnated with a silane compound or a silane compound containing solution, and thereafter chemical polymerization of a precursor monomer is completed. Thereby, the concentration of the silane compound in the conductive polymer layer in the vicinity of the dielectric coating film can be suppressed low, and thus the ESR of solid electrolytic capacitor 500 can be reduced.

Consequently, it has become possible to improve voltage proof property while suppressing increases in the leak current and the short circuit occurrence ratio of the solid electrolytic capacitor, and to reduce the ESR thereof.

As a solvent used in the silane compound containing solution, a volatile organic solvent such as alcohols, hydrocarbons, esters, and ketones can be used. The silane compound in the silane compound containing solution preferably has a concentration of 10 to 100 wt %. The silane compound may also be used alone, without being diluted with a solvent. It is to be noted that a silane compound containing solution containing a silane compound at a concentration of 100 wt % is equal to the silane compound.

In a case of a chip type solid electrolytic capacitor fabricated by subsequently forming a dielectric coating film, a conductive polymer layer, and a cathode drawing layer on a surface of an anode body made of a sintered body or a foil piece of a valve metal, when a silane compound layer is formed after forming the conductive polymer layer, the silane compound layer is formed at an interface between the conductive polymer layer and the cathode drawing layer, which may result in an increase in the ESR. In a case of a winding type solid electrolytic capacitor, the concentration of a silane compound in a conductive polymer layer formed at a gap between an anode body and a cathode body can be suppressed low, and thus an increase in the ESR of the solid electrolytic capacitor can be reduced.

Although the present embodiment is a winding type solid electrolytic capacitor, it may be a chip type solid electrolytic capacitor, or a multi-layered solid electrolytic capacitor having a plurality of stacked capacitor elements.

<Second Embodiment>

A solid electrolytic capacitor 600 manufactured by a method of manufacturing a solid electrolytic capacitor in accordance with a second embodiment has a configuration identical to that of solid electrolytic capacitor 500 described above except for the configuration of a conductive polymer layer and the presence of a silane compound layer. Therefore, the configuration of solid electrolytic capacitor 600 will be described, only on the differences from that of solid electrolytic capacitor 500.

In a solid electrolytic capacitor 600, a conductive polymer layer as a solid electrolyte is formed at each gap between anode body 21, cathode body 22, and separator 23 of capacitor element 60. Further, a silane compound layer is formed on a surface of a conductive polymer layer formed on an outer peripheral side of capacitor element 60. Herein, the silane compound layer refers to a surface layer portion of the conductive polymer layer into which a silane compound is incorporated in a high concentration, and a layer made of a silane compound formed on the surface of the conductive polymer layer.

Figure 4:
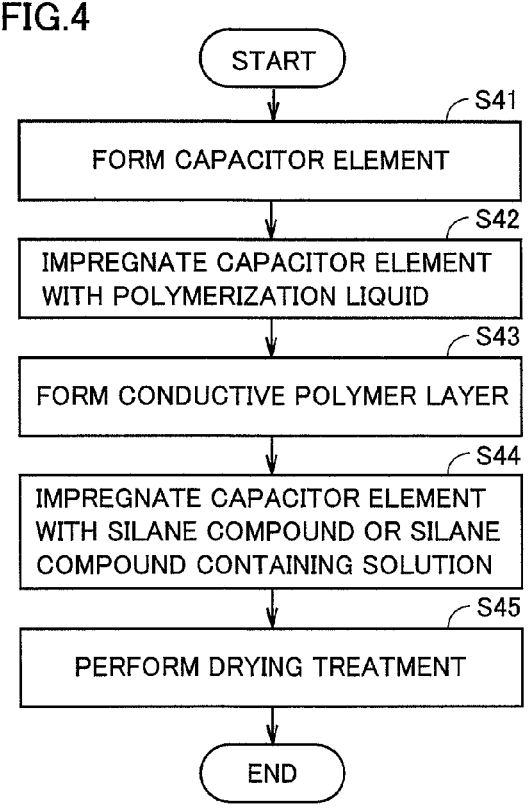
FIG. 4 is a flowchart showing a process of manufacturing a capacitor element in accordance with a second embodiment.

A method of manufacturing solid electrolytic capacitor 600 described above will be described using FIG. 4.

Firstly, in step S41, capacitor element 60 is formed. The method of forming capacitor element 60 in step S41 is identical to that in step S31 of FIG. 3, and the description thereof will not be repeated.

Then, in step S42, a polymerization liquid containing a precursor monomer to be a conductive polymer and an oxidant is prepared, and capacitor element 60 is impregnated with the polymerization liquid.

Subsequently, in step S43, chemical polymerization of the polymerization liquid penetrating into capacitor element 60 is completed, and thereby a conductive polymer layer is formed.

Next, in step S44, capacitor element 60 having the formed conductive polymer layer is impregnated with a silane compound or a silane compound containing solution containing a silane compound.

Thereafter, in step S45, capacitor element 60 impregnated with the silane compound or the silane compound containing solution is dried at a prescribed temperature. Thereby, a silane compound layer is formed on the conductive polymer layer formed on an outer peripheral side of capacitor element 60.

Through the steps described above, capacitor element 60 having the conductive polymer layer in which the silane compound layer is present is fabricated. After capacitor element 60 is accommodated in bottomed case 11, capacitor element 60 is sealed with sealing member 12, the vicinity of the opening end of bottomed case 11 is subjected to pressing in the lateral direction and curling, and seat plate 13 is placed on the curled portion. Thereby, solid electrolytic capacitor 600 shown in FIG. 1 is fabricated.

As described above, since the silane compound has no conductivity, when a wound body is impregnated with a polymerization liquid into which a silane compound is added, and a precursor monomer is chemically polymerized, a capacitor may have an increased ESR.

Regarding this, in the second embodiment, capacitor element 60 having the formed conductive polymer layer is impregnated with a silane compound containing solution. Thereby, a silane compound layer is formed on the conductive polymer layer on the outer peripheral side of capacitor element 60, and the concentration of the silane compound in the conductive polymer layer formed at the gap between anode body 21 and cathode body 22 can be suppressed low. As a result, an increase in the ESR of solid electrolytic capacitor 600 can be reduced. Consequently, it has become possible to improve voltage proof property while suppressing increases in the leak current and the short circuit occurrence ratio of the solid electrolytic capacitor, and to reduce the ESR thereof.

In a case of a chip type solid electrolytic capacitor fabricated by subsequently forming a dielectric coating film, a conductive polymer layer, and a cathode drawing layer on a surface of an anode body made of a sintered body or a foil piece of a valve metal, when a silane compound layer is formed after forming the conductive polymer layer, the silane compound layer is formed at an interface between the conductive polymer layer and the cathode drawing layer, which may result in an increase in the ESR. In a case of a winding type solid electrolytic capacitor, the concentration of a silane compound in a conductive polymer layer formed at a gap between an anode body and a cathode body can be suppressed low, and thus an increase in the ESR of the solid electrolytic capacitor can be reduced.

As a solvent used in the silane compound containing solution, a volatile organic solvent such as alcohols, hydrocarbons, esters, and ketones can be used. The silane compound in the silane compound containing solution preferably has a concentration of 5 to 100 wt %. The silane compound may also be used alone, without being diluted with a solvent. It is to be noted that a silane compound containing solution containing a silane compound at a concentration of 100 wt % is equal to the silane compound.

Further, capacitor element 60 impregnated with the silane compound containing solution is preferably dried at a prescribed temperature to remove the unwanted solvent. A drying temperature is preferably not less than 50° C. in terms of the efficiency of removing the solvent, and preferably not more than 150° C. in terms of suppressing thermal load on capacitor element 60 and denaturation of the silane compound by heat. Further, a drying time is preferably 30 to 120 minutes to stabilize the silane compound.

Up to this point, the first embodiment and the second embodiment have been described.

As the silane compound used in the first and the second embodiments, vinyltrichlorosilane, vinyltrimethoxysilane, vinyltriethoxysilane, β-(3,4-epoxy-cyclohexyl)ethyltrimethoxysilane, γ-glycidoxypropyltrimethoxysilane, γ-methacryloxypropyltrimethoxysilane, γ-glycidoxypropylmethyldiethoxysilane, p-styryltrimethoxysilane, γ-methacryloxypropylmethyldimethoxysilane, γ-methacryloxypropylmethyldiethoxysilane, γ-methacryloxypropyltriethoxysilane, γ-acryloxypropyltrimethoxysilane, N-2-(aminoethyl)-γ-aminopropylmethyldimethoxysilane, N-2-(aminoethyl)-γ-aminopropyltrimethoxysilane, N-2-(aminoethyl)-γ-aminopropyltriethoxysilane, γ-aminopropyltrimethoxysilane, γ-aminopropyltriethoxysilane, N-phenyl-3-aminopropyltrimethoxysilane, γ-chloropropyltrimethoxysilane, γ-mercaptopropylmethyldimethoxysilane, γ-mercaptopropyltrimethoxysilane, γ-glycidoxypropyltriethoxysilane, or the like is preferable.

β-(3,4-epoxy-cyclohexyl)-ethyltrimethoxysilane, γ-acryloxypropyltrimethoxysilane, γ-glycidoxypropyltrimethoxysilane, γ-methacryloxypropyltrimethoxysilane, γ-glycidoxypropylmethyldiethoxysilane, or γ-glycidoxypropyltriethoxysilane is more preferable. Further, two or more types of these silane compounds may be combined and used.

Examples of a method of impregnating the capacitor element with a silane compound or a silane compound containing solution in the first and the second embodiments include a method of immersing the capacitor element in a silane compound or a silane compound containing solution, a method of applying a silane compound or a silane compound containing solution to the capacitor element, a method of spraying a silane compound or a silane compound containing solution on the capacitor element, and the like.

Examples of a conductive polymer that can be used to form the conductive polymer layer in the first and the second embodiments include conductive polymers of the aliphatic series, the aromatic series, the heterocyclic series, and the heteroatom-containing series. Further, two or more types of these conductive polymers may be combined and used. In particular, using a polythiophene, polyaniline, or polypyrrole conductive polymer is preferable.

As the oxidant that can be used in the first and the second embodiments, conventionally known oxidants including ferric p-toluenesulfonic acid salt can be used. Further, the oxidant can be used in a state dissolved in an alcohol such as methanol, ethanol, butanol, or the like. In this case, it is preferable to use the oxidant at a concentration of 35 to 70 wt %.

EXAMPLES OF THE FIRST EMBODIMENT

Example 1

Firstly, etching treatment was performed on surfaces of anode body 21 and cathode body 22 made of aluminum foil. Thereafter, a dielectric coating film was formed by immersing anode body 21 subjected to etching treatment in a chemical conversion solution and applying a voltage of 150 V.

Lead tab 16A and lead tab 16B were connected to anode body 21 and cathode body 22, respectively. Then, anode body 21 and cathode body 22 were wound together with separator 23, and the outermost periphery was secured with winding stop tape 24 to fabricate capacitor element 50.

Subsequently, capacitor element 50 was subjected to chemical conversion treatment of a cut section. Chemical conversion treatment of a cut section was performed by immersing capacitor element 50 in a chemical conversion solution and applying voltage.

Next, a polymerization liquid was prepared. The polymerization liquid was prepared by mixing 3,4-ethylenedioxythiophene as a precursor monomer and a butanol solution of ferric p-toluenesulfonic acid as an oxidant. The concentration of p-toluenesulfonic acid in the butanol solution of ferric p-toluenesulfonic acid was set to 40 wt %. Weight percentages of 3,4-ethylenedioxythiophene and the butanol solution of ferric p-toluenesulfonic acid were set to 25 wt % and 75 wt %, respectively.

Then, capacitor element 50 was immersed in the polymerization liquid, and thereafter capacitor element 50 was immersed in a silane compound containing solution. The silane compound containing solution was prepared using γ-acryloxypropyltrimethoxysilane as a silane compound and butanol as a solvent. The concentration of the silane compound in the silane compound containing solution was set to 10 wt %.

Thereafter, 3,4-ethylenedioxythiophene penetrating into capacitor element 50 was thermally polymerized to form a conductive polymer layer inside capacitor element 50.

Thereafter, capacitor element 50 was accommodated in bottomed case 11, and sealing member 12 was inserted into an opening end portion of bottomed case 11, which was then subjected to pressing in a lateral direction and curling. Then, seat plate 13 was provided on a curled surface, and leads 14A and 14B connected to lead tabs 16A and 16B, respectively, were pressed and bent to complete solid electrolytic capacitor 500.

Example 2

A solid electrolytic capacitor was fabricated as in Example 1 except for setting the concentration of the silane compound in the silane compound containing solution to 20 wt %.

Example 3

A solid electrolytic capacitor was fabricated as in Example 1 except for setting the concentration of the silane compound in the silane compound containing solution to 50 wt %.

Example 4

A solid electrolytic capacitor was fabricated as in Example 1 except for setting the concentration of the silane compound in the silane compound containing solution to 100 wt %, that is, using the silane compound without diluting it.

Example 5

A solid electrolytic capacitor was fabricated as in Example 1 except for using γ-glycidoxypropyltrimethoxysilane as the silane compound.

Example 6

A solid electrolytic capacitor was fabricated as in Example 2 except for using γ-glycidoxypropyltrimethoxysilane as the silane compound.

Example 7

A solid electrolytic capacitor was fabricated as in Example 3 except for using γ-glycidoxypropyltrimethoxysilane as the silane compound.

Example 8

A solid electrolytic capacitor was fabricated as in Example 4 except for using γ-glycidoxypropyltrimethoxysilane as the silane compound.

Comparative Example 1

A solid electrolytic capacitor was fabricated as in Example 1 except for setting the concentration of the silane compound in the silane compound containing solution to 1 wt %.

Comparative Example 2

A solid electrolytic capacitor was fabricated as in Example 1 except for setting the concentration of the silane compound in the silane compound containing solution to 5 wt %.

Comparative Example 3

A solid electrolytic capacitor was fabricated as in Comparative Example 1 except for using γ-glycidoxypropyltrimethoxysilane as the silane compound.

Comparative Example 4

A solid electrolytic capacitor was fabricated as in Comparative Example 2 except for using γ-glycidoxypropyltrimethoxysilane as the silane compound.

Comparative Example 5

A solid electrolytic capacitor was fabricated as in Example 1 except for performing chemical polymerization after immersing capacitor element 50 in the polymerization liquid, without immersing it in the silane compound containing solution.

Table 1 shows measurement results of electric properties indicating average values of 20 solid electrolytic capacitors for each of the examples and the comparative examples. The solid electrolytic capacitors had a rated voltage of 35 V, a capacitance of 22 μF, and dimensions of 10 mm in diameter and 12 mm in height. The short circuit occurrence ratio indicates a short circuit occurrence ratio in the solid electrolytic capacitor obtained after performing aging treatment on the solid electrolytic capacitor at 125° C. for five hours. The capacitance and the dielectric loss tangent were measured at a frequency of 120 Hz, and the ESR was measured at a frequency of 100 kHz. Further, the leak current indicates a value obtained two minutes after starting application of the rated voltage to the solid electrolytic capacitor. The BDV value (voltage proof property) indicates a breakdown voltage for the solid electrolytic capacitor measured by applying voltage increased at a rate of 1 V/s to the solid electrolytic capacitor in a room temperature environment.

TABLE 1

|  | Silane Compound | Concentration of Silane Compound (wt %) | Short Circuit Occurrence Ratio (%) | Capacitance (μF) | Dielectric Loss Tangent (%) | ESR (mΩ) | Leak Current (μA) | BDV Value (V) |
| --- | --- | --- | --- | --- | --- | --- | --- | --- |
| Example 1 | A | 10 | 1.5 | 24.8 | 2.8 | 28.7 | 5.3 | 67.6 |
| Example 2 | A | 20 | 0.2 | 24.6 | 2.9 | 29.5 | 0.9 | 69.5 |
| Example 3 | A | 50 | 0.0 | 24.6 | 3.2 | 30.5 | 0.3 | 75.2 |
| Example 4 | A | 100 | 0.0 | 24.8 | 3.1 | 35.2 | 0.4 | 79.1 |
| Example 5 | B | 10 | 1.8 | 24.2 | 3.3 | 29.9 | 3.2 | 66.5 |
| Example 6 | B | 20 | 0.2 | 24.4 | 3.2 | 31.0 | 1.2 | 68.2 |
| Example 7 | B | 50 | 0.1 | 24.4 | 3.5 | 31.5 | 0.8 | 72.9 |
| Example 8 | B | 100 | 0.0 | 24.2 | 3.6 | 34.9 | 0.9 | 80.0 |
| Comparative Example 1 | A | 1 | 35.2 | 23.5 | 4.8 | 53.2 | 29.2 | 49.9 |
| Comparative Example 2 | A | 5 | 12.3 | 24.1 | 3.5 | 39.1 | 14.2 | 53.2 |
| Comparative Example 3 | B | 1 | 41.0 | 22.2 | 5.1 | 52.2 | 35.6 | 51.9 |
| Comparative Example 4 | B | 5 | 18.1 | 23.5 | 4.1 | 41.2 | 13.9 | 54.3 |
| Comparative Example 5 | — | — | 26.5 | 24.2 | 2.9 | 30.2 | 9.8 | 54.2 |

*A: γ-acryloxypropyltrimethoxysilane
B: γ-glycidoxypropyltrimethoxysilane

The results in Table 1 show that, in the solid electrolytic capacitors of Examples 1 to 8, the short circuit occurrence ratio and the leak current were lower and the BDV value was higher than those of the solid electrolytic capacitor of Comparative Example 5. Since the BDV value was higher, it was found that the solid electrolytic capacitors of Examples 1 to 8 have higher voltage proof properties than that of the solid electrolytic capacitor of Comparative Example 5. Therefore, it was possible to improve voltage proof property while suppressing increases in the leak current and the short circuit occurrence ratio of the solid electrolytic capacitor, by immersing the capacitor element in the polymerization liquid, then immersing the capacitor element in the silane compound containing solution, and thereafter completing chemical polymerization.

It was also found as a result of comparing Examples 1 to 8 and Comparative Examples 1 to 4 that, as the concentration of the silane compound in the silane compound containing solution was increased, the short circuit occurrence ratio and the leak current were decreased and the BDV value was increased. This tendency was particularly significant when the concentration of the silane compound was not less than 10 wt %. Therefore, the effects of suppressing increases in the short circuit occurrence ratio and the leak current and improving voltage proof property can be further enhanced by increasing the concentration of the silane compound.

Examples of the Second Embodiment

Example 9

Firstly, etching treatment was performed on surfaces of anode body 21 and cathode body 22 made of aluminum foil. Thereafter, a dielectric coating film was formed by immersing anode body 21 subjected to etching treatment in a chemical conversion solution and applying a voltage of 150 V.

Lead tab 16A and lead tab 16B were connected to anode body 21 and cathode body 22, respectively. Then, anode body 21 and cathode body 22 were wound together with separator 23, and the outermost periphery was secured with winding stop tape 24 to fabricate capacitor element 60.

Subsequently, capacitor element 60 was subjected to chemical conversion treatment of a cut section. Chemical conversion treatment of a cut section was performed by immersing capacitor element 60 in a chemical conversion solution and applying voltage.

Next, a polymerization liquid was prepared. The polymerization liquid was prepared by mixing 3,4-ethylenedioxythiophene as a monomer and a butanol solution of ferric p-toluenesulfonic acid as an oxidant. The concentration of p-toluenesulfonic acid in the butanol solution of ferric p-toluenesulfonic acid was set to 40 wt %. Weight percentages of 3,4-ethylenedioxythiophene and the butanol solution of ferric p-toluenesulfonic acid were set to 25 wt % and 75 wt %, respectively.

Then, capacitor element 60 subjected to chemical conversion treatment of a cut section was immersed in the polymerization liquid, and thereafter a conductive polymer layer was formed by thermochemically polymerizing 3,4-ethylenedioxythiophene.

Thereafter, capacitor element 60 was immersed in a silane compound containing solution for one minute, and then capacitor element 60 was dried at 100° C. to form a silane compound layer. The silane compound containing solution was prepared using γ-mercaptopropyltrimethoxysilane as a silane compound and ethanol as a solvent. The concentration of the silane compound in the silane compound containing solution was set to 1.0 wt %.

Thereafter, capacitor element 60 including the conductive polymer layer having the silane compound layer was accommodated in bottomed case 11, and sealing member 12 was inserted into an opening end portion of bottomed case 11, which was then subjected to pressing in a lateral direction and curling. Then, seat plate 13 was provided on a curled surface, and leads 14A and 14B connected to lead tabs 16A and 16B, respectively, were pressed and bent to complete solid electrolytic capacitor 600.

Example 10

A solid electrolytic capacitor was fabricated as in Example 9 except for setting the concentration of the silane compound in the silane compound containing solution to 5.0 wt %.

Example 11

A solid electrolytic capacitor was fabricated as in Example 9 except for setting the concentration of the silane compound in the silane compound containing solution to 10 wt %.

Example 12

A solid electrolytic capacitor was fabricated as in Example 9 except for setting the concentration of the silane compound in the silane compound containing solution to 50 wt %.

Example 13

A solid electrolytic capacitor was fabricated as in Example 9 except for setting the concentration of the silane compound in the silane compound containing solution to 100 wt %, that is, using the silane compound without diluting it.

Example 14

A solid electrolytic capacitor was fabricated as in Example 10 except for drying capacitor element 60 at a drying temperature of 150° C. after immersing it in the silane compound containing solution.

Example 15

A solid electrolytic capacitor was fabricated as in Example 11 except for drying capacitor element 60 at a drying temperature of 150° C. after immersing it in the silane compound containing solution.

Example 16

A solid electrolytic capacitor was fabricated as in Example 12 except for drying capacitor element 60 at a drying temperature of 150° C. after immersing it in the silane compound containing solution.

Example 17

A solid electrolytic capacitor was fabricated as in Example 10 except for drying capacitor element 60 at a drying temperature of 200° C. after immersing it in the silane compound containing solution.

Example 18

A solid electrolytic capacitor was fabricated as in Example 11 except for drying capacitor element 60 at a drying temperature of 200° C. after immersing it in the silane compound containing solution.

Example 19

A solid electrolytic capacitor was fabricated as in Example 12 except for drying capacitor element 60 at a drying temperature of 200° C. after immersing it in the silane compound containing solution.

Comparative Example 6

A solid electrolytic capacitor was fabricated as in Example 9 except for not immersing capacitor element 60 in the silane compound containing solution and not drying capacitor element 60 after the conductive polymer layer was formed in capacitor element 60.

Table 2 shows measurement results of electric properties indicating average values of 20 solid electrolytic capacitors for each of the examples and the comparative examples. The solid electrolytic capacitors had a rated voltage of 35 V, a capacitance of 22 µF, and dimensions of 10 mm in diameter and 12 mm in height. The short circuit occurrence ratio indicates a short circuit occurrence ratio in the solid electrolytic capacitor obtained after performing aging treatment on the solid electrolytic capacitor at 125° C. for five hours. The capacitance and the dielectric loss tangent were measured at a frequency of 120 Hz, and the ESR was measured at a frequency of 100 kHz. Further, the leak current indicates a value obtained two minutes after starting application of the rated voltage to the solid electrolytic capacitor. The BDV value (voltage proof property) indicates a breakdown voltage for the solid electrolytic capacitor measured by applying voltage increased at a rate of 1 V/s to the solid electrolytic capacitor in a room temperature environment.

TABLE 2

| | Concentration of Silane Compound (wt %) | Drying Temperature (° C.) | Short Circuit Occurrence Ratio (%) | Capacitance (µF) | Dielectric Loss Tangent (%) | ESR (mΩ) | Leak Current (µA) | BDV Value (V) |
|---|---|---|---|---|---|---|---|---|
| Example 9 | 1 | 100 | 19.2 | 24.4 | 2.8 | 28.7 | 13.3 | 55.2 |
| Example 10 | 5 | 100 | 2.2 | 24.8 | 2.8 | 29.2 | 2.3 | 63.0 |
| Example 11 | 10 | 100 | 1.2 | 24.7 | 3.1 | 29.1 | 1.8 | 64.1 |
| Example 12 | 50 | 100 | 0.8 | 24.7 | 3.4 | 30.3 | 1.8 | 66.8 |
| Example 13 | 100 | 100 | 0.7 | 24.7 | 3.7 | 32.1 | 1.2 | 68.0 |
| Example 14 | 5 | 150 | 2.5 | 24.8 | 2.8 | 30.5 | 3.8 | 61.1 |
| Example 15 | 10 | 150 | 1.9 | 24.8 | 2.9 | 33.2 | 1.5 | 62.5 |
| Example 16 | 50 | 150 | 1.2 | 24.9 | 3.1 | 34.1 | 1.6 | 65.2 |
| Example 17 | 5 | 200 | 10.8 | 24.8 | 2.5 | 42.6 | 9.9 | 55.8 |
| Example 18 | 10 | 200 | 7.5 | 24.7 | 2.4 | 45.2 | 7.2 | 56.5 |
| Example 19 | 50 | 200 | 4.1 | 24.8 | 2.7 | 50.6 | 7.9 | 57.2 |
| Comparative Example 6 | — | — | 24.4 | 24.3 | 2.8 | 30.3 | 22.8 | 54.3 |

The results in Table 2 show that, in the solid electrolytic capacitors of Examples 9 to 19, the short circuit occurrence ratio and the leak current were lower and the BDV value was higher than those of the solid electrolytic capacitor of Comparative Example 6. Since the BDV value was higher, it was found that the solid electrolytic capacitors of Examples 9 to 19 have higher voltage proof properties than that of the solid electrolytic capacitor of Comparative Example 6. Therefore, it was possible to improve voltage proof property while suppressing increases in the leak current and the short circuit occurrence ratio of the solid electrolytic capacitor, by immersing the capacitor element having the formed conductive polymer layer in the silane compound containing solution to form the silane compound layer.

It was also found as a result of comparing Example 9 and Examples 10 to 13 that, as the concentration of the silane compound in the silane compound containing solution was increased, the short circuit occurrence ratio and the leak current were decreased and the BDV value was increased. This tendency was particularly significant when the concentration of the silane compound was not less than 5 wt %. Therefore, the effects of suppressing increases in the short circuit occurrence ratio and the leak current and improving voltage proof property can be further enhanced by increasing the concentration of the silane compound in the silane compound containing solution.

Further, it was also found as a result of comparing Examples 9 to 16 and Examples 17 to 19 that, as the drying temperature was decreased, the short circuit occurrence ratio, the ESR, and the leak current were decreased and the BDV value was increased. This tendency was particularly significant when the drying temperature was not more than 150° C. Therefore, the effects of suppressing increases in the short circuit occurrence ratio, the ESR, and the leak current and improving voltage proof property can be further enhanced by decreasing the drying temperature.

The embodiments and examples described above are merely provided to describe the present invention, and should not be interpreted as restricting the invention described in the scope of claims. The present invention can be freely modified within the scope of claims and within the scope having equivalent meaning. For example, a valve metal such as tantalum, niobium, titanium, or the like may be used for the anode body, other than aluminum.

What is claimed is:

1. A method of manufacturing a solid electrolytic capacitor, comprising the steps of:
    forming a capacitor element including an anode body having a dielectric coating film on a surface thereof;
    impregnating the capacitor element with a polymerization liquid containing a precursor monomer of a conductive polymer and an oxidant;
    impregnating the capacitor element impregnated with said polymerization liquid with a silane compound or a silane compound containing solution; and
    forming a conductive polymer layer by polymerization the precursor monomer after impregnating the capacitor element with the silane compound or the silane compound containing solution wherein
    the capacitor element is formed by winding the anode body and a cathode body,
    the concentration of the silane compound in the conductive polymer layer formed between the anode body and the cathode body is lower than the concentration of the silane compound in the conductive polymer layer formed on an outer peripheral side of the capacitor element.

2. The method of manufacturing a solid electrolytic capacitor according to claim 1, wherein
    said silane compound containing solution is made of a silane compound and an organic solvent, and
    the silane compound in the silane compound containing solution has a concentration of not less than 10 wt %.

3. The method of manufacturing a solid electrolytic capacitor according to claim 2, wherein said organic solvent is at least one of organic solvents including alcohols, hydrocarbons, esters, and ketones.

* * * * *